United States Patent
Mao et al.

(10) Patent No.: US 10,187,391 B2
(45) Date of Patent: Jan. 22, 2019

(54) DATA ACCESS BY EXTERNAL USERS

(71) Applicant: SAP SE, Walldorf (DE)

(72) Inventors: Yonghong Mao, South San Francisco, CA (US); Zhi Zhang, Shanghai (CN); Neil Jayesh Patel, Menlo Park, CA (US); Edward Lu, American Canyon, CA (US); Jessica Yang, Sunnyvale, CA (US)

(73) Assignee: SAP SE, Walldorf (DE)

( * ) Notice: Subject to any disclaimer, the term of this patent is extended or adjusted under 35 U.S.C. 154(b) by 217 days.

(21) Appl. No.: 15/147,911

(22) Filed: May 6, 2016

(65) Prior Publication Data

US 2017/0324740 A1    Nov. 9, 2017

(51) Int. Cl.
*G06F 7/04*     (2006.01)
*H04L 29/06*   (2006.01)
*G06F 21/62*   (2013.01)
*G06F 21/60*   (2013.01)

(52) U.S. Cl.
CPC .......... *H04L 63/101* (2013.01); *G06F 21/604* (2013.01); *G06F 21/6245* (2013.01)

(58) Field of Classification Search
CPC ......... H04L 63/08; H04L 63/10; H04L 63/20; G06F 21/6218
See application file for complete search history.

(56) References Cited

U.S. PATENT DOCUMENTS

| | | | | |
|---|---|---|---|---|
| 5,778,373 A * | 7/1998 | Levy | ............... | G06F 17/30569 |
| | | | | 707/748 |
| 6,061,678 A * | 5/2000 | Klein | ............... | G06F 17/30321 |
| 6,578,037 B1 * | 6/2003 | Wong | ............... | G06F 17/30471 |
| | | | | 707/694 |
| 7,822,761 B2 * | 10/2010 | Kussmaul | ............ | G06Q 10/00 |
| | | | | 707/723 |
| 8,554,835 B1 * | 10/2013 | Williams | ............ | G06Q 50/01 |
| | | | | 705/319 |
| 8,638,912 B2 * | 1/2014 | Clark | .................. | G06Q 10/10 |
| | | | | 379/93.12 |
| 2009/0248737 A1 * | 10/2009 | Shukla | ............. | G06F 9/44 |
| 2015/0019484 A1 * | 1/2015 | Mack | ............... | G06F 17/30294 |
| | | | | 707/622 |

* cited by examiner

*Primary Examiner* — Ali S Abyaneh
(74) *Attorney, Agent, or Firm* — Fountainhead Law Group P.C.

(57) ABSTRACT

Described herein is a framework for providing and securing data access by external users. In accordance with one aspect of the framework, an external schema is generated to pair with an existing company schema in a database. The company schema may own data stored in the database. One or more access-control views that expose one or more subsets of the data may further be generated. The external schema may be granted access to the one or more access-control views. Synonyms may be created to rename access-control views, so that the synonyms share common names with corresponding database objects accessible via the company schema. External users may then access the data visible to them via the synonyms that are used to alias the access-control views.

14 Claims, 2 Drawing Sheets

DATA ACCESS BY EXTERNAL USERS

TECHNICAL FIELD

The present disclosure relates generally to computer systems, and more specifically, to a framework for providing secured data access by external users.

BACKGROUND

Over the years, human resources (HR) software applications have evolved to offer more and more features that enable external users to interact directly with the HR systems. An external user is a person who has been granted access to an organization's website (or application), but who is not a licensed user within the organization. External users are users who are not employees, contractors or onsite agents for the organization, unlike internal users who are typically employees of the organization. For example, recruitment software applications or websites usually interface with external users, such as job applicants and third party recruitment agency users, as one of the core features.

On one hand, it is desirable to store and manage external users' data and internal users' data in the same system and in the same data structures for ease of use and management. On the other hand, such data co-location introduces security challenges, particularly the challenge of protecting sensitive information about internal users, such as social security numbers, birthday, and compensation data, from being accessed or hacked via external users' access points.

SUMMARY

A framework for providing data access to external users is described herein. In accordance with one aspect of the framework, an external schema is generated to pair with an existing company schema in a database. The company schema may own data stored in the database. One or more access-control views that expose one or more subsets of the data may further be generated. The external schema may be granted access to the one or more access-control views. A database query may then be executed against the external schema to access the one or more subsets of data for the external users.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein.

DETAILED DESCRIPTION

Figure 1:
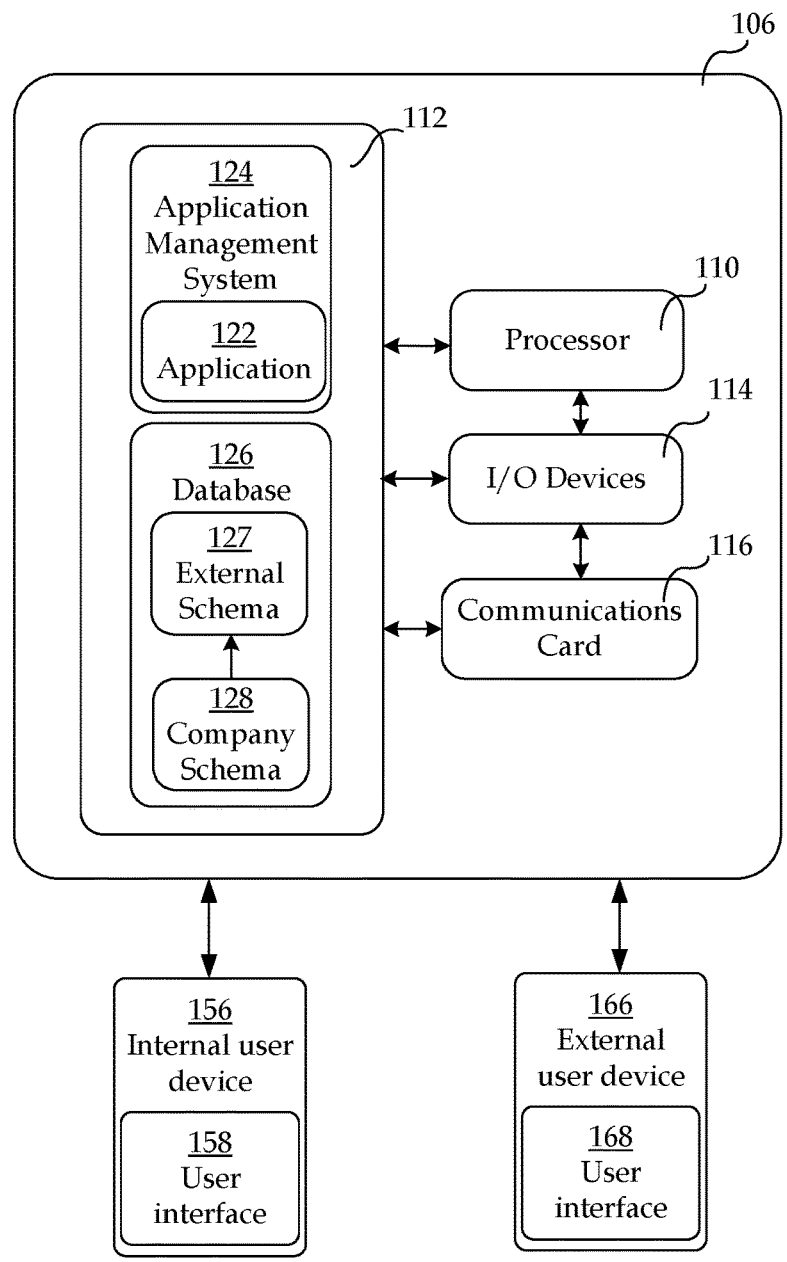
FIG. 1 is a block diagram illustrating an exemplary architecture.

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

External users are often just a temporary phase in the lives of internal users, so it is highly desirable to utilize the same personal data structures and relationships for external users as those used for internal users. Personal data collected from external users, such as home address, phone, experience, education and other similar information, should be readily available after employment. It is also desirable that recruitment data be available in conjunction with post-employment information (e.g., performance reviews) to measure the effectiveness of recruitment, and that internal information (e.g., previous internal work history) is available for recruiting alumni candidates after their employment is terminated. It is also highly desirable to have a unified user account management solution for both internal and external users, and allow users to use the same user account to access different functionalities (e.g., recruiting and learning) without having to create separate user accounts.

A framework for facilitating secure external user access is described herein. In accordance with one aspect, a separate external database schema (hereinafter "external schema") is created for each company database schema (hereinafter "company schema") to manage external users' access to the internal database system. Separation between the internal and external users' data accesses may be provided at the database level to help secure data belonging to internal users from being accessed by external users.

In some implementations, each client company has an internal schema and an external schema. The internal schema owns all its data, including data for both internal and external users. Internal users access data via the internal schema, whereas external users access data via the external schema. User account data, personal data and shared reference data may be stored in the same table structures.

In accordance with another aspect, the external schema is granted access to data only via access-control views (or external views). Such access-control views are database views that may be updatable or read-only, and may be defined in the company schema and granted to the external schema to allow external users to access data intended for them only. Synonyms may be defined to reference the access-control views, so that the synonyms have the same names as the underlying database objects (e.g., tables, views) to minimize or eliminate any need for changing existing application code that reference the database objects. The access-control views may be used to restrict external users' access to their own data in the same tables so that they cannot access the data for internal users that are also stored in the same physical tables.

There are at least four advantages of using a separate external schema. First, it provides security at a database level to separate external users' access from internal users' access. With a separate schema for external users, even a hacker who bypasses the application layer security as an external user to gain access to the database cannot view data intended only for internal users. This is because his or her access is completely restricted by the external schema to view external users' data only. This feature protects internal users' data from being accessed via SQL injection by external users. Second, a separate external schema allows the use of the same physical tables to manage both internal users' and external users' data. Third, with separate schemas, database resources can be allocated differently for external users and internal users so that their performance Service Level Agreements (SLAs) may be better managed. Fourth, by using a separate schema with access-control views, data can be shared and reused easily, since data intended for both internal users and external users are stored in the same physical tables.

The present framework may support access to Recruiting, Onboarding, and/or Learning Management System (LMS) features by external users (e.g., job applicants, recruitment agency users). It may also prevent external users from unexpectedly accessing data that belong to internal users. Performance and scalability concerns of a large number of external users accessing the same system along with internal users may be addressed. The framework may avoid or minimize the need to replicate and/or synchronize data between different stages in the lifecycle of the same user. Architectural complexity and the amount of engineering effort required to implement and maintain such a solution may advantageously be minimized. These and other exemplary features and advantages will be described herein.

It should be appreciated that the framework described herein may be implemented as a method, a computer-controlled apparatus, a computer process, a computing system, or as an article of manufacture such as a computer-usable medium. These and various other features and advantages will be apparent from the following description.

FIG. 1 is a block diagram illustrating an exemplary architecture 100 in accordance with one aspect of the present framework. Generally, exemplary architecture 100 may include a computer system 106, one or more internal user devices 156 and one or more external user devices 166.

Computer system 106 is capable of responding to and executing computer-readable instructions in a defined manner. Computer system 106 may include a processor 110, input/output (I/O) devices 114 (e.g., touch screen, keypad, touch pad, display screen, speaker, etc.), a memory module 112, and a communications card or device 116 (e.g., modem and/or network adapter) for exchanging data with a network (e.g., local area network or LAN, wide area network (WAN), Internet, etc.). It should be appreciated that the different components and sub-components of computer device 106 may be located or executed on different machines or systems. For example, a component may be executed on many computer systems connected via the network at the same time (i.e., cloud computing).

Memory module 112 may be any form of non-transitory computer-readable media, including, but not limited to, dynamic random access memory (DRAM), static random access memory (SRAM), Erasable Programmable Read-Only Memory (EPROM), Electrically Erasable Programmable Read-Only Memory (EEPROM), flash memory devices, magnetic disks, internal hard disks, removable disks or cards, magneto-optical disks, Compact Disc Read-Only Memory (CD-ROM), any other volatile or non-volatile memory, or a combination thereof. Memory module 112 serves to store machine-executable instructions, data, and various software components for implementing the techniques described herein, all of which may be processed by processor 110. As such, computer device 106 is a general-purpose computer system that becomes a specific-purpose computer system when executing the machine-executable instructions. Alternatively, the various techniques described herein may be implemented as part of a software product. Each computer program may be implemented in a high-level procedural or object-oriented programming language (e.g., C, C++, Java, JavaScript, Advanced Business Application Programming (ABAP™) from SAP® AG, Structured Query Language (SQL), etc.), or in assembly or machine language if desired. The language may be a compiled or interpreted language. The machine-executable instructions are not intended to be limited to any particular programming language and implementation thereof. It will be appreciated that a variety of programming languages and coding thereof may be used to implement the teachings of the disclosure contained herein.

In some implementations, memory module 112 includes one or more applications 122, an application management system 124 and a database 126. Application 122 is any software framework that provides services to internal and external users, such as recruitment, onboarding, learning management, enterprise resource management, and any other services. Application 122 may reference (or process) data stored in the database 126. The application management system 124 serves to manage and run application 122, and to manage the application's access to database 126.

Database 126 is an organized collection of data, such as tables, queries, reports, views, schemas and other objects. Database 126 may also include a database management system (DBMS), which is a system software for creating and managing databases 126. The DBMS provides users and programmers with a systematic way to create, retrieve, update and manage data. Database 126 may be based on a relational model, such as SAP HANA, Oracle Database, Microsoft SQL Server, MySQL, IBM DB2, IBM Informix, and so forth. Other types of database technology may also be used.

In some implementations, database 126 stores user account information as well as associated personal data (e.g., name, address, user name, password, contact information) for both external users and internal users commonly in the same physical data structures (e.g., tables). Reference data may be shared between the external users and internal users. The rest of the external users' data may be stored in physical tables separate from those used to store internal users' data.

Providing separate storage for external and internal users' data may offer various benefits. For example, it may provide more freedom in developing and supporting new features and functionalities for external users without impacting designs for internal users. Additionally, since quality control for data entry by external users may be less stringent than that for internal users, having external users' data stored separately functions as a staging area for data cleansing before being moved or copied into data structures for internal users, such as when job applicants become new employees. With separate data structures, requirements, such as allowing applicants to register without providing an email address while requiring an email address for internal users, can easily be accommodated.

Database 126 may be defined by at least one external schema 127 and at least one existing company schema 128. In some implementations, company schema 128 is granted access to all data, including tables for both internal and external users, as well as external views and shared tables for external users. All physical tables may be created in the company schema 128. External access-control views and privilege grants may be used to provide data access to external users. More particularly, company schema 128 grants external schema 127 access to only external users' data and shared tables via access-control views.

Computer system 106 may operate in a networked environment communicatively coupled to internal user device 156 and external user device 166. Internal user device 156 includes a user interface 158 that enables an internal user (e.g., employee) to access services provided by application 122 and data provided via the company schema 128. External user device 166 includes a user interface 168 that enables an external user (e.g., job applicant, third party) to access services provided by application 122 and data provided via the external schema 127. Both internal user device 156 and external user device 166 are computing devices capable of responding to and executing computer-readable instructions in a defined manner. Both devices 156, 166 may include, for example, a processor, a memory module, I/O devices, communications device, and so forth.

Figure 2:
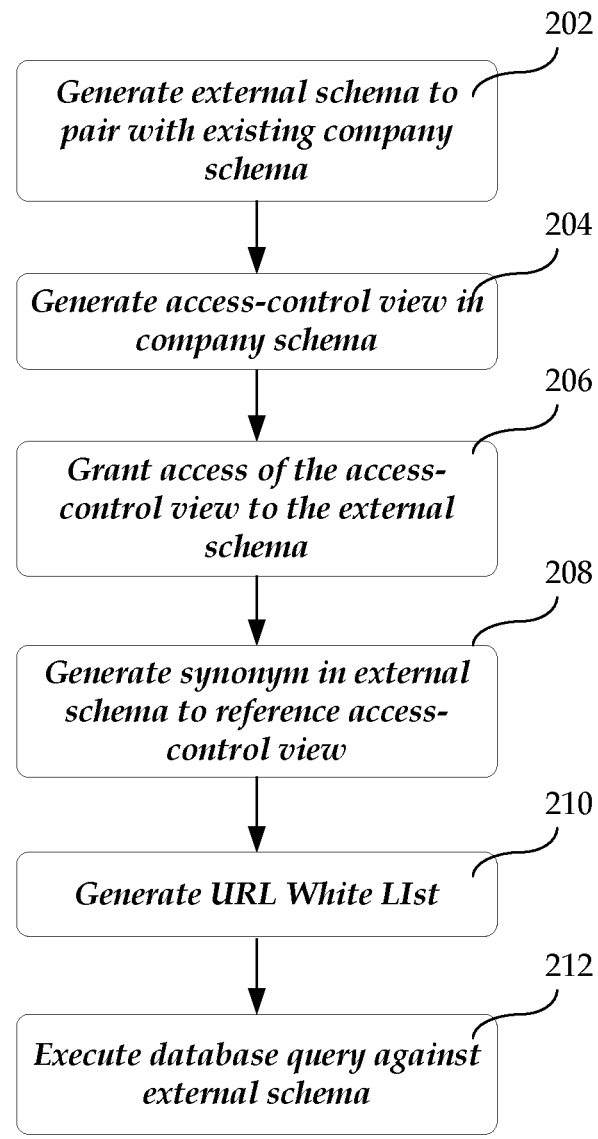
FIG. 2 shows an exemplary method for implementing the external schema.

FIG. 2 shows an exemplary method 200 for implementing the external schema 128. The method 200 may be performed automatically or semi-automatically by the system 100, as previously described with reference to FIG. 1. It should be noted that in the following discussion, reference will be made, using like numerals, to the features described in FIG. 1.

At 202, an external schema 127 is created in database 126 to pair with an existing company schema 128. There may be multiple existing company schemas 128 in the database 126. A companion external schema may be created for each existing company schema 128 to prevent external users from accessing internal users' data unexpectedly. For example, for a given company schema SFQA4_HLIU02, a companion external schema SFQA4_HLIU02_EXT may be automatically generated. The company schema 128 owns (or granted access to) all data for both internal users and external users. All data may be accessed via the company schema 128, whereas external users can access only data exposed to the external schema 127 using access-control (or external) views. Optionally, a separate schema may be created to restrict internal users' access. In other words, the present framework may be readily used to restrict access of any given type of users if so desired.

At 204, one or more access-control views are generated in the existing company schema 128. Multiple access-control views may be generated in the company schema 128. An access-control view is defined to expose a subset of data stored in database 126 that are intended for access by external users using external schema 127. In some implementations, the access-control view is updatable. This means that records visible in the access-control view may be inserted, updated or deleted.

The access-control view may be defined by first logging into the existing company schema (e.g., SFQA4_HLIU02) and creating a view (e.g., generic_object_t_ext_v) in the existing company schema (e.g., SFQA4_HLIU02) to include only data (e.g., records, tables) intended to be accessed by external users. As an example, a view to expose only records from an identified object (e.g., Country) may be defined as follows:

create view sfqa4_hliu02.generic_object_t_ext_v as select*from sfqa4_hliu02.generic_object_t where object_type in ('Country') with check option;

Similarly, views may be generated to expose records in other tables to be accessible by external users. The view criteria on the access control views for data filtering may be based on attributes or properties that identify data for external users. The view criteria may be dynamic in the sense that when new data is added for external users, the view criteria do not need to change. For example, the filter on generic_object_t may be defined as follows:

access_type='EXTERNAL' or object_type in (select object_type from external objects);

Accordingly, the view does not need to change when a new custom object is added. For any new tables created to support new features in a new release, new views or synonyms for access control views may be created as needed.

Different types of data may be exposed to the external schema 127, depending on different scenarios. Access-control views may be defined with filters, "with check option" (i.e., updatable) or "with read only" clauses to further secure these views. It should be appreciated that the following examples are provided for illustration purposes only and are not exhaustive.

In an exemplary scenario, for a given table TableX, external users may need to access only records created for (or by) themselves (i.e., internal users' records are not visible to external users). Such view may be defined as follows:

create view Vas select*from TableX where visibility='Y' with check option;

If TableX is a child table of TableY and visibility column is not to be added to TableX, then the view may be defined as follows:

create view Vas select*from TableX where FK in (select PK from TableY where visibility='Y') with check option;

Visible records may be identified by a visibility flag as shown in the above example, and they can also be identified by any other criteria that can filter the data correctly.

In another exemplary scenario, for a given table TableX, external users may require read-only access to all records in the database 126. The access-control view may be defined as follows:

create view Vas select*from TableX with read only;

In yet another exemplary scenario, for a given table TableX, external users may require access to records created for themselves, but also non-sensitive records of internal users excluding any columns containing sensitive data. For example, external users may access their own records in PER_PERSON table as well as internal users' records excluding their DateOfBirth values.

The access-control view may be defined as follows:

create view V as select non-sensitive-column1 . . . n, NULL as DateOfBirth from PER_PERSON;

However, it returns NULL as DateOfBirth for external users too, which is not right. The above query may be modified as follows:

create view V as Select non-sensitive-column1 . . . n, decode(visibility, 'Y', DateOfBirth, NULL) as DateOfBirth from PER_PERSON;

With this modified view, external users' DateOfBirth may be accessed, but not the internal users' DateOfBirth. However, it is not updatable as DateOfBirth is a virtual column.

Another option is to split the existing PER_PERSON table into two tables, one named PER_PERSON with all non-sensitive data and the other named BiographicalInfo with sensitive data such as DateOfBirth. The following views may be defined on top of these two tables as follows:

create view V1 as select*from PER_PERSON;
create view V2 as select*from BiographicalInfo where visibility='Y' with check option;

This approach has the advantages of protecting internal users' sensitive information DateOfBirth and still allowing external users to update their own DateOfBirth via V2 and accessing internal persons' non-sensitive information via V1. However, it has the following disadvantages: (1) requires physical data model changes; (2) requires data migration—moving DateOfBirth from PER_PERSON to BiographicalInfo; (3) requires changes to application SQLs that access DateOfBirth; and (4) allows hackers to delete/update internal persons' PER_PERSON records as V1 is an updatable view.

The following alternative definition does not require a new object of BiographicalInfo:
    create view V1 as select*from PER_PERSON where visibility='Y' with check option;
    create view V2 as select non-sensitive-column1 . . . n from PER_PERSON with read only;

Although the application still needs to work with two entities, it has the following advantages: (1) requires no physical data model changes; (2) requires no data migration; (3) does not allow hackers to delete/update internal persons' PER_PERSON records; and (4) allows external users to update their own DateOfBirth while protecting internal users' sensitive information.

In another exemplary scenario, the given table may contain a subset of data that external users should access, but this subset of data is not identified by a visibility flag. Instead, it is identified by some other attributes. For example, it may be a case where external users should access only the work phone number (not personal phone numbers) of hiring managers and recruiters. The select criteria may be defined based on the type of phone and the job positions. To implement this, a database view may be defined with the correct select criterion and then granted READ-ONLY access to the external schema, as follows:
    create view Vas select*from PERSON_PHONES
    where phone_type='work'
    and person_id in (select person_id from PER POSITIONS where position='hiring manager') with read only;

In yet another scenario, information about internal users may be copied into table records that are intended to be accessible by external users. For example, contact information of interviewers may be copied into the interview schedule records so that the candidate can access interviewers' contact information.

At 206, appropriate access privileges on the access-control view may be granted to the external schema 127 in database 126. Access may be granted to allow the external users to select, delete, update and/or insert records exposed by the access-control view (e.g., sfqa4_hliu02.generic_object_t_ext_v) via the external schema (e.g., SFQA4_HLIU02 EXT).

For example, the following grants may be defined in the company schema 128 to implement such access control:
    grant select on sfqa4_hliu02.generic_object_t_ext_v to SFQA4_HLIU02_EXT
    grant delete on sfqa4_hliu02.generic_object_t_ext_v to SFQA4_HLIU02_EXT
    grant update on sfqa4_hliu02.generic_object_t_ext_v to SFQA4_HLIU02_EXT
    grant insert on sfqa4_hliu02.generic_object_t_ext_v to SFQA4_HLIU02_EXT To confirm that only records from the Country object are visible via the external schema, the database designer (or other user) may log in as SFQA4_HLIU02_EXT and run the following query:
    select object_type, count(1) from SFQA4_HLIU02.generic_object_t_ext_v group by object_type;

At 208, a synonym is created in the external schema 127 to reference the access-control view. More particularly, synonyms may be defined in the external schema 127 to rename the access-control views. The synonyms share common names with corresponding database objects (e.g., views, tables) accessible by internal users via the company schema 128. Synonyms are created so that any references in application 122 to the underlying database objects will automatically point to the access-control views when accessed by external users without having to change the existing code in application 122. Application 122 may directly execute the database query against the synonym instead of the access-control view. In other words, external users may access the data visible to them via the synonyms that are used to alias the access-control views. By having the access-control views share the same names as the underlying database objects, existing application code may advantageously be used for both internal and external users.

For example, application code that references the database table PER_PERSON may access the companySchema.PER_PERSON table for internal users; for external users, the application code may access the externalSchema.PER_PERSON synonym. Application 122 may include logic that adds the owning schema name in front of each database object to be accessed so that the correct database objects can be transparently used. Accordingly, security may be enforced without having to change the existing application code.

Within the schema SFQA4_HLIU02_EXT, a synonym may be created so that the upper layer logic can still uses the same name to reference the generic_object_t table.
    create synonym generic_object_t for SFQA4_HLIU02.generic_object_t_ext_v;

By creating such synonyms, access-control views accessible by external users via the external schema share common names with corresponding database objects (e.g., tables, view) accessible by internal users via the company schema, so that the application logic does not need to be changed for it to work for both internal and external users.

The database designer (or user) may run various database queries to confirm that the external schema works as desired. For example, to confirm that the synonym works as expected, the following queries may be run while still logged in as SFQA4_HLIU02_EXT:
    select object_type, count(1) from generic_object_t group by object_type
    select object_type, count(1) from SFQA4_HLIU02_EXT.generic_object_t group by object_type To confirm that the view is an updatable view, the following queries may be run while still logged in as SFQA4_HLIU02_EXT:
    update generic_object_t set sf_field100='test100'
    update generic_object_t set sf_field100=null
    insert into generic_object_t (row_id,object_type,internal_id,effective_start_date,effective_end_date,transaction_sequence,effective_status,external_code, external_name,created_date,created_by,last_modified_date, last_modified_by,external_code_upper,object_type_id)
    select row_id+1000000000,object_type,internal_id+1000000000,effective_start_date, effective_end_date,transaction_sequence,effective_status,external_code, external_name,created_date,created_by,last_modified_date, last_modified_by,external_code_upper,object_type_id from generic_object_t To confirm that the external user cannot access the generic_object_t table in the existing company schema, while still logged in as SFQA4_HLIU02_EXT, the following query may be run:
    select object_type, count(1) from SFQA4_HLIU02.generic_object_t group by object_type In response to the query, an error message should be displayed, such as follows:

Could not execute 'select object_type, count(1) from SFQA4_HLIU02.generic_object_t group by object_type' in 17 ms 986 μs. SAP DBTech JDBC: [258]: insufficient privilege: Not authorized At 210, a Uniform Resource Locator (URL) white list is created. External users should view only resources (e.g., web pages, documents, files) referenced by uniform resource locators (URLs) that are intended for them, and should not be able to access any resources that are not meant to be used by external users. In order to implement this URL control, a URL white list may be maintained in database 126 or application 122. All URLs that reference resources that are intended to be used by external users should be included and configured in this white list. Ajax URLs may also be configured in this white list. A filter may be added to check this white list. If a request for a resource referenced by a particular URL is from an external user and the particular URL is not on the white list, application 122 will deny this request.

The URL white list secures access to resources that are stored in a non-database system, whereby external access cannot be controlled by using access-control views. For example, the stock option grant or bonus award letters that are stored in a document management system may be secured via the URL white list, so that only internal users (not external users) are given access to these URLs.

At 212, application 122 may execute a database query against the external schema 127 to access data stored in database 126 intended for the external users. In some implementations, the database query may be executed against the one or more synonyms defined in the external schema 127 aliasing the corresponding one or more access-control views. The database query may be invoked by application 122 via the external schema 127. When an external user logs into the application 122, the application tier may connect to the external schema 127 as a database user who is different from the database user used for connecting an internal user to the database. This approach will strictly restrict an external user's access to be within the external schema 127.

In some architectures, the same database user is used to connect to the database on behalf of end users. Every database object access may be prefixed with the company schema name associated with the logged-in user, so that database access is confined to the logged-in user's company schema. The framework will operate within such architecture seamlessly as the correct external schema will be associated with a given external user and his/her access to any database object will be prefixed with the correct external schema name so that the same level of access control will be enforced.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A system for providing data access to external users, comprising:
 one or more non-transitory computer-readable media for storing a database and computer-readable program code; and
 one or more processors in communication with the one or more non-transitory computer-readable media, the one or more processors being operative with the computer-readable program code to perform operations comprising:
  storing first data for a plurality of external users in a plurality of tables of the database;
  storing second data for a plurality of internal users in a plurality of tables of the database, wherein at least a first portion of the first data and the second data are stored in the same tables of the database, wherein at least a second portion of the first data and second data are stored in separate tables of the database, and wherein at least one user has data included in both the first data and second data where the at least one user was an external user before becoming an internal user;
  generating a company schema in the database, wherein the company schema grants access to both the first data and second data stored in the database;
  generating one or more read only or updatable access-control views that expose the first data for the plurality of external users stored in the database;
  generating an external scheme, wherein the company schema grants the external schema access to only the first data via the access-control views;
  creating, in the external schema, one or more synonyms to reference the one or more access-control views, wherein each of the one or more synonyms shares a common name with a corresponding database object accessible via the company schema, and;
  accessing one or more subsets of the data for the external users by executing a database query against the one or more synonyms.

2. The system of claim 1 wherein the one or more processors are further operative with the computer-readable program code to:
 receive a request to access a resource referenced by a uniform resource locator (URL), and
 in response to determining the request is sent by one of the external users and the URL is not on a white list, denying the request to access the resource.

3. The system of claim 2 wherein the resource is stored in a non-database system.

4. A method of providing data access to external users, comprising:
 storing first data for a plurality of external users in a plurality of tables of a database;
 storing second data for a plurality of internal users in a plurality of tables of the database, wherein at least a first portion of the first data and the second data are stored in the same tables of the database, wherein at least a second portion of the first data and second data are stored in separate tables of the database, and wherein at least one user has data included in both the first data and second data where the at least one user was an external user before becoming an internal user;
 generating a company schema in the database, wherein the company schema grants access to both the first data and second data stored in the database;
 generating one or more read only or updatable access-control views that expose the first data for the plurality of external users stored in the database;
 generating an external scheme, wherein the company schema grants the external schema access to only the first data via the access-control views; and accessing at least a portion of the first data for the external users by executing a database query against the external schema.

5. The method of claim 4 further comprising identifying one or more subsets of the data exposed by the one or more access-control views with a visibility flag.

6. The method of claim 4 wherein the generating the one or more access-control views comprises defining a criterion to select one or more subsets of the data based on one or more attributes.

7. The method of claim 4 wherein the one or more access-control views expose records created for the external users.

8. The method of claim 4 wherein the one or more access-control views expose records created for the external users and non-sensitive records associated with the internal users.

9. The method of claim 4 wherein the one or more access-control views expose information about the internal users intended to be accessible by the external users.

10. The method of claim 4 further comprises creating one or more synonyms in the external schema to reference the one or more access-control views.

11. The method of claim 4 further comprises:
receiving a request to access a resource referenced by a uniform resource locator (URL); and
in response to determining that the request is sent by one of the external users and the URL is not on a white list, denying the request to access the resource.

12. The method of claim 11 wherein the resource is stored in a non-database system.

13. The method of claim 12 wherein the non-database system comprises a document management system.

14. One or more non-transitory computer-readable media having stored thereon program code, the program code executable by a computer to perform steps comprising:
storing first data for a plurality of external users in a plurality of tables of a database;
storing second data for a plurality of internal users in a plurality of tables of the database, wherein at least a first portion of the first data and the second data are stored in the same tables of the database, wherein at least a second portion of the first data and second data are stored in separate tables of the database, and wherein at least one user has data included in both the first data and second data where the at least one user was an external user before becoming an internal user;
generating a company schema in the database, wherein the company schema grants access to both the first data and second data stored in the database;
generating one or more read only or updatable access-control views that expose the first data for the plurality of external users stored in the database;
generating an external scheme, wherein the company schema grants the external schema access to only the first data via the access-control views; and
accessing at least a portion of the first data for the external users by executing a database query against the external schema.

* * * * *